Aug. 5, 1958 D. C. PROBST 2,846,265
VENTILATION WINDOW BOOSTER
Filed Jan. 8, 1957 5 Sheets-Sheet 1
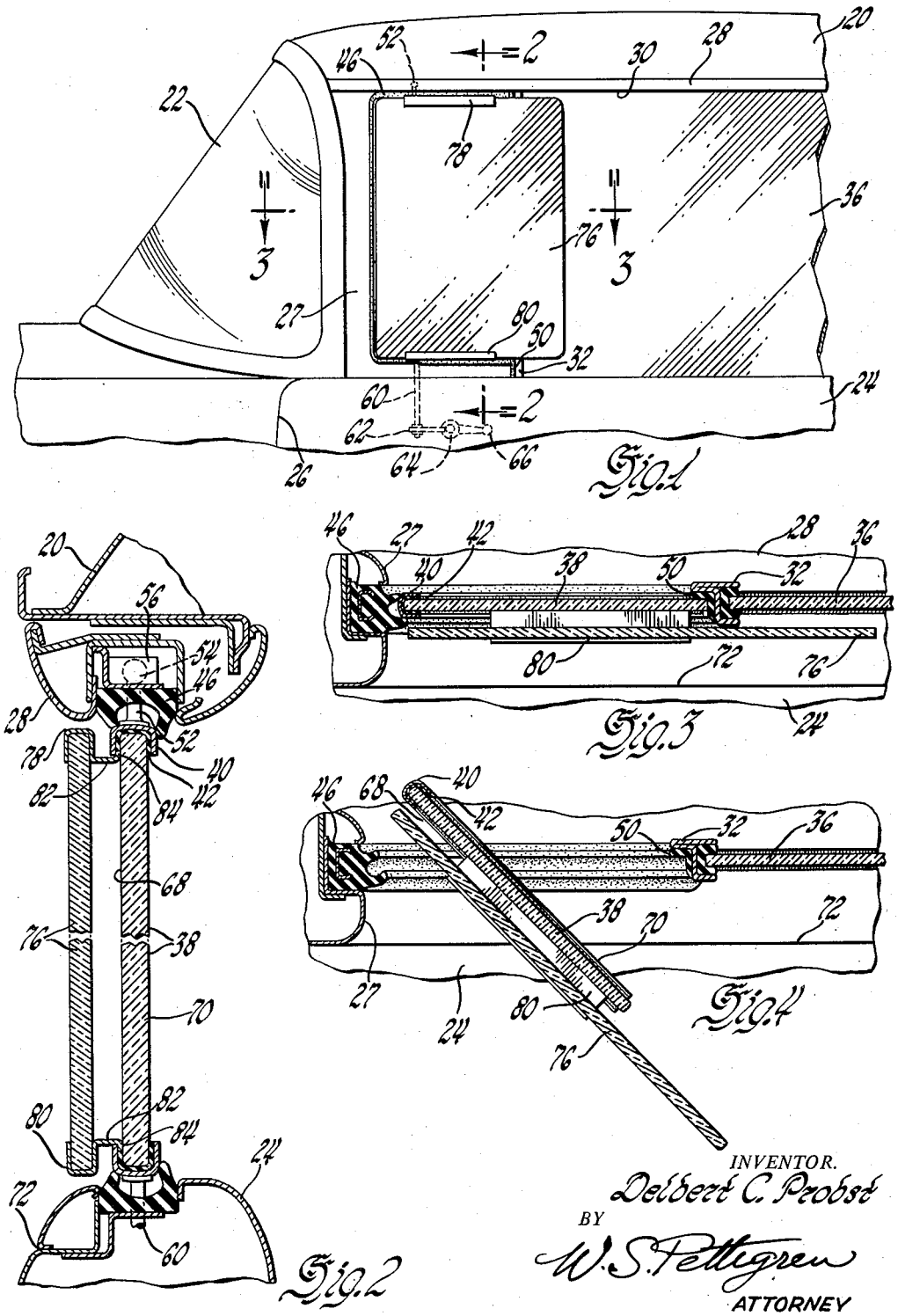
INVENTOR.
Delbert C. Probst
BY
W. S. Pettigrew
ATTORNEY Aug. 5, 1958 D. C. PROBST 2,846,265
VENTILATION WINDOW BOOSTER
Filed Jan. 8, 1957 5 Sheets-Sheet 2
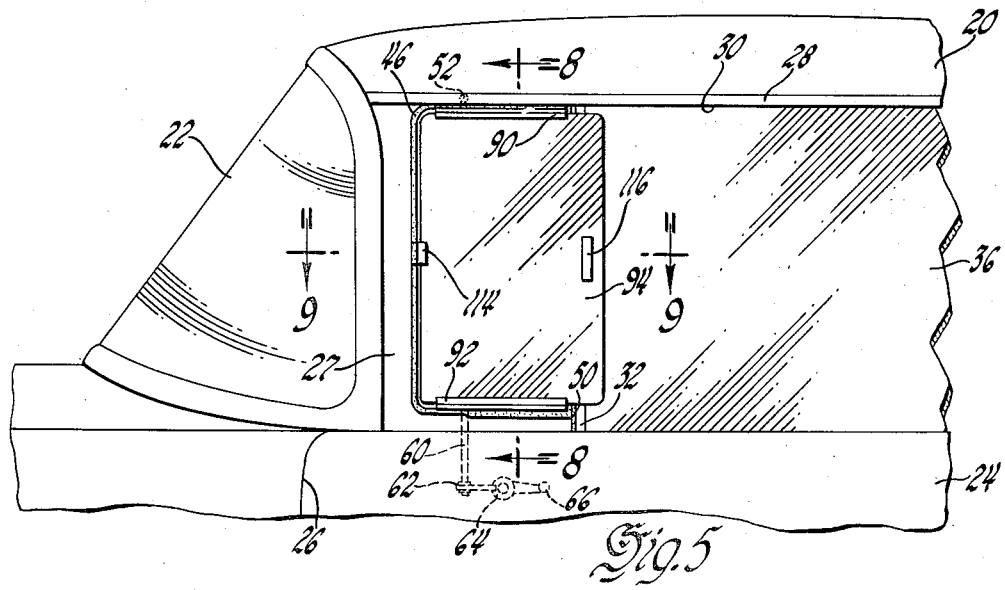
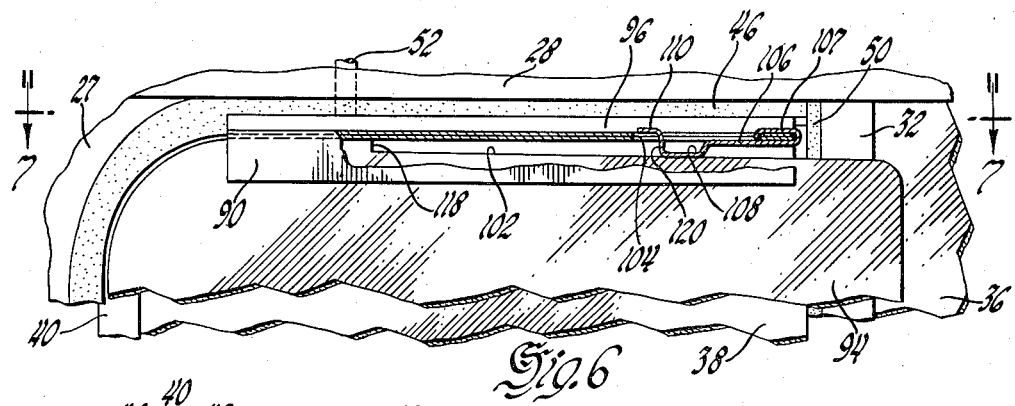
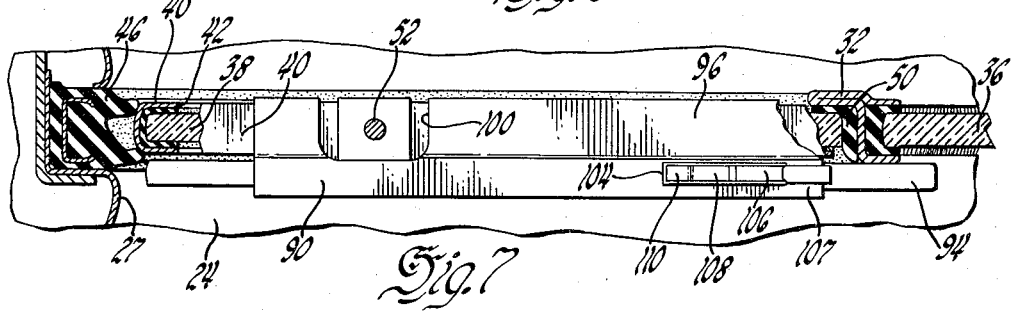
INVENTOR.
Delbert C. Probst
BY
W. S. Pettigrew
ATTORNEY Aug. 5, 1958     D. C. PROBST     2,846,265
VENTILATION WINDOW BOOSTER Filed Jan. 8, 1957     5 Sheets-Sheet 3

INVENTOR.
Delbert C. Probst
BY
W. S. Pettigrew
ATTORNEY

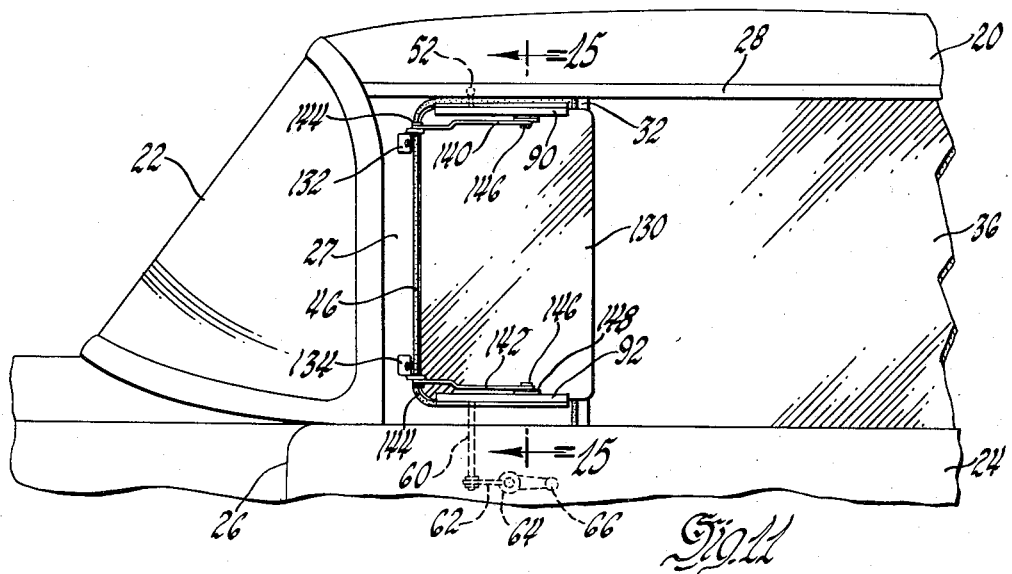
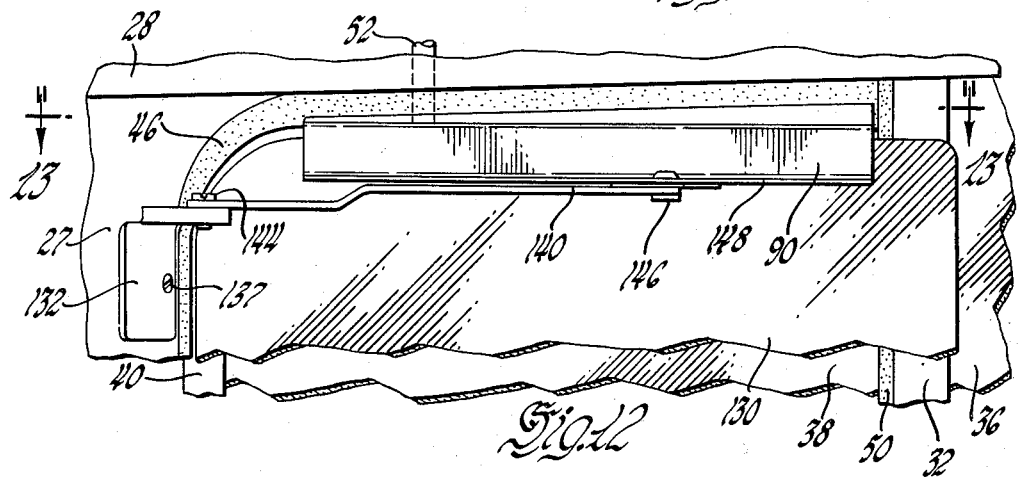
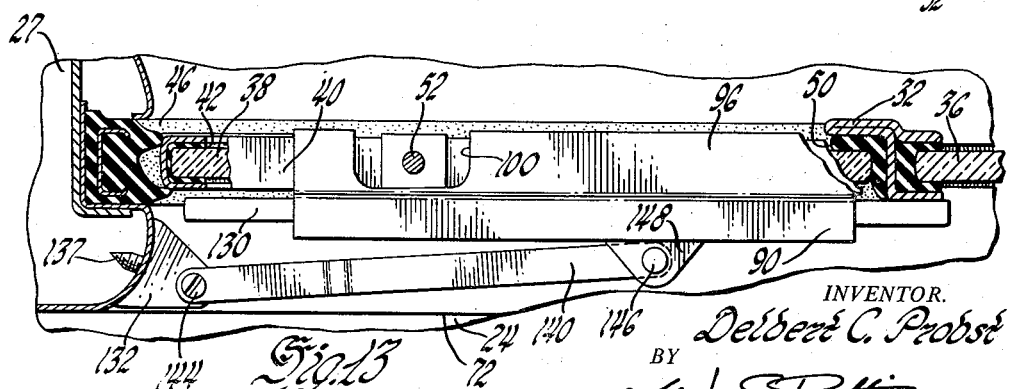

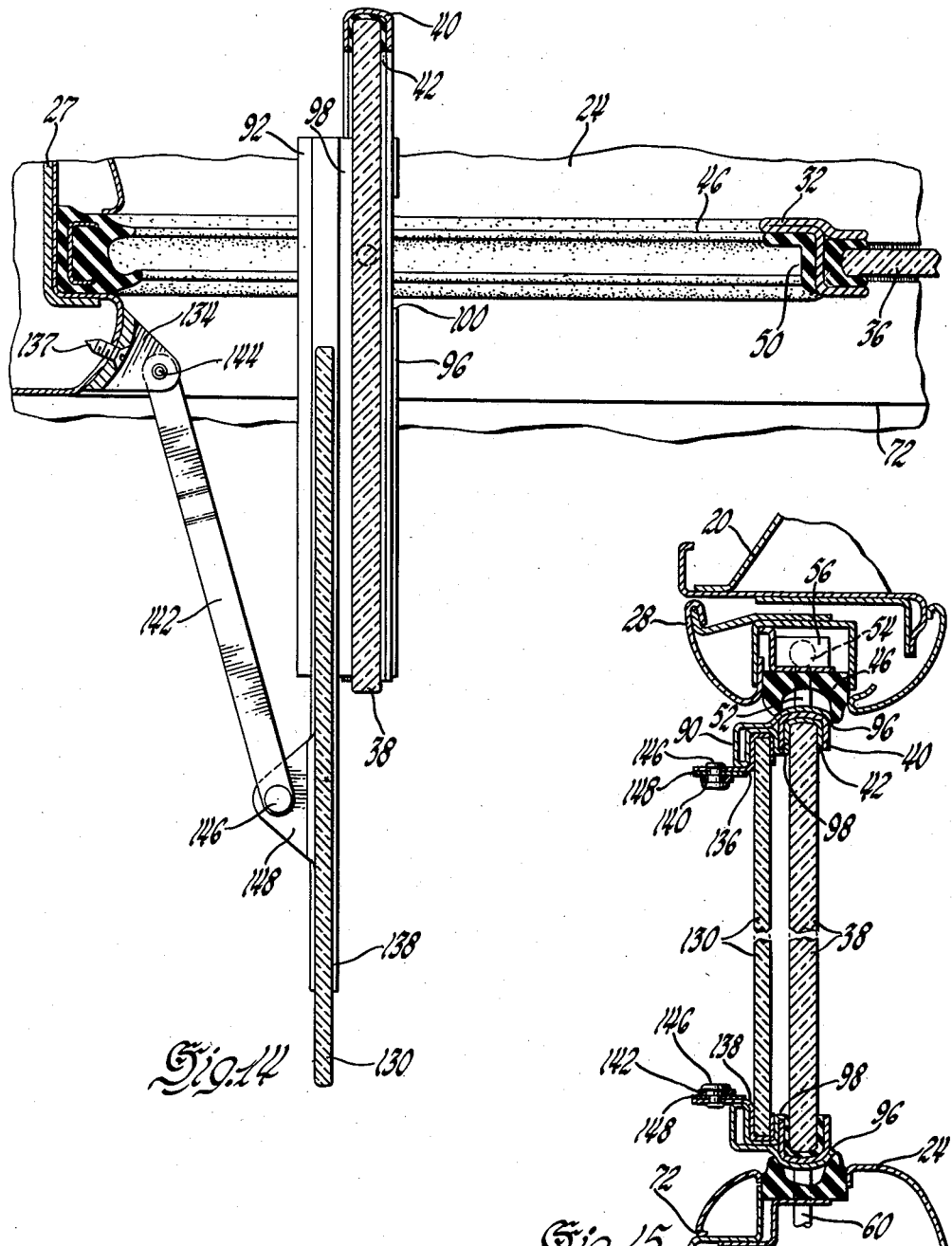

United States Patent Office 2,846,265
Patented Aug. 5, 1958

2,846,265

VENTILATION WINDOW BOOSTER

Delbert C. Probst, Detroit, Mich., assignor to General Motors Corporation, Detroit, Mich., a corporation of Delaware Application January 8, 1957, Serial No. 633,085

10 Claims. (Cl. 296—44)

This invention relates to window arrangements for vehicle bodies and more particularly to improved ventilation window arrangements for vehicle bodies.

The window arrangement of the front doors of vehicle bodies often includes a vertically movable window to open and close the rear portion of the window opening and a swingably mounted ventilation window to open and close the forward portion of the window opening. In the open position of the ventilation window, one portion of the window projects outwardly of the body so as to deflect oncoming air inwardly of the body along the outer surface of the window while the air within the body is exhausted outwardly of the body along the rear surface of the window. These front door ventilation windows have been in production usage for many years and comprise what is commonly known as a "no-draft" ventilation system.

With the advent of the wrap-around windshield, the forward portion of the front door has been partially cut away above the body belt line to provide the necessary space for the windshield on either side of the body. This has led to a reduction in the size of the ventilation window whereby the ventilation window is less able to perform its function of deflecting oncoming air inwardly of the body and exhausting air from within the body, since only a relatively small window area may be projected outwardly of the body. This creates a problem in the ventilation of automobiles, particularly in view of the widespread public acceptance of the "no-draft" ventilation system. This invention is concerned primarily with solving this problem and, in its preferred embodiments, generally provides a second window supported by the ventilation window for movement therewith and projecting outwardly of the ventilation window in the open position thereof so as to provide an increased effective window area projecting outwardly of the body. This increased effective window area provides an adequate deflection area for the oncoming air and also increases the effectiveness of the ventilation window in exhausting air from within the body.

The second window does not hinder the vision of the driver in any manner and no portion of the window projects within the body beyond the ventilation window so as to create a hindrance to the driver or passenger within the body in the open position thereof. The second window may either be fixed to the ventilation window outwardly thereof or may be slidably supported on the ventilation window outwardly thereof so as to be projected therebeyond when the ventilation window is moved to open position. Either manner of supporting the second window on the ventilation window is suitable.

The primary object of this invention is to provide an improved window arrangement for vehicle bodies. Another object of this invention is to provide an improved ventilation window arrangement for vehicle bodies. A further object of this invention is to provide an improved ventilation window arrangement for vehicle bodies which includes a transparent panel supported by the ventilation window and projecting outwardly of the ventilation window in the open position thereof to increase the effective window area outwardly of the body. Yet, another object of this invention is to provide a ventilation window arrangement for vehicle bodies which includes a transparent panel slidably supported on the ventilation window and movable relative thereto when the ventilation window is in open position so as to project outwardly of the body therebeyond and provide an increased air deflection area for the oncoming air stream.

These and other objects of this invention will be readily apparent from the following specification and drawings, in which:

Figure 1 is a partial side elevational view of a vehicle body embodying one embodiment of a ventilation window arrangement according to this invention;

Figure 2 is a sectional view taken on the plane indicated by line 2—2 of Figure 1;

Figure 3 is a view taken on the plane indicated by line 3—3 of Figure 1 and showing the ventilation window arrangement in closed position;

Figure 4 is a view similar to Figure 3 and showing the ventilation window arrangement in open position;

Figure 5 is a view similar to Figure 1 and showing another embodiment of a ventilation window arrangement according to this invention;

Figure 6 is an enlarged view of a portion of Figure 5, with parts thereof broken away for clarity of illustration;

Figure 7 is a sectional view taken on the plane indicated by line 7—7 of Figure 6 with parts thereof broken away for clarity of illustration;

Figure 11 is a view similar to Figure 1 and showing a further embodiment of a ventilation window arrangement according to this invention;

Figure 12 is an enlarged view of a portion of Figure 11;

Figure 13 is a sectional view taken on the plane indicated by line 13—13 of Figure 12, with parts thereof broken away for clarity of illustration;

Figure 14 is a view similar to Figure 13 and showing the ventilation window arrangement in open position; and Figure 15 is a sectional view taken on the plane indicated by line 15—15 of Figure 11.

Figure 8:
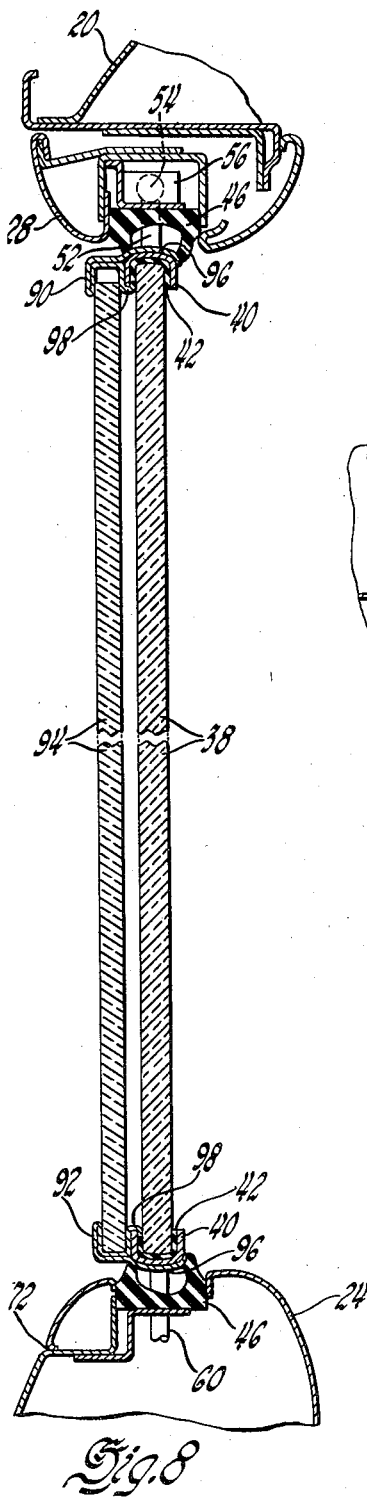
Figure 8 is a sectional view taken on the plane indicated by line 8—8 of Figure 5.
Figure 9:
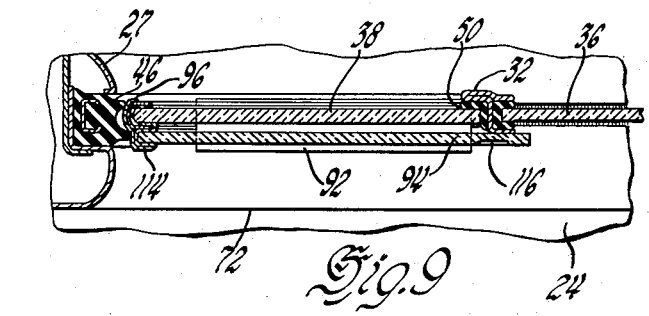
Figure 9 is a sectional view taken on the plane indicated by line 9—9 of Figure 5 and showing the ventilation window arrangement in closed position.

Referring now particularly to Figures 1 through 4 of the drawings, one embodiment of a ventilation window arrangement according to this invention will be described. A vehicle body 20 includes a windshield 22 of the wrap-around type and a front door 24 which is hinged at its forward edge 26 to the body by suitable hinges and is latched at its rearward edge to the body by a suitable latch. The forward portion of door 24 projects forwardly beneath the windshield 22 so that the forward frame member 27 of the generally U-shaped upper door frame 28 is located rearwardly of the forward edge of the door. The upper frame 28 of door 24 defines a window opening 30 divided into forward and rear portions by a guide channel 32. The rear portion of the window opening 30 is opened and closed by a vertically movable window 36 having its forward edge slidably received within guide channel 32 and its rearward edge slidably received within a similar guide channel.

The forward portion of the window opening 30 is opened and closed by a ventilation window 38. As can be seen particularly in Figures 2, 3, and 4, the upper, lower, and forward edge portions of the ventilation window 38 are received within a continuous generally U-shaped frame 40, with a weather strip 42 of generally the same shape as frame 40 being provided therebetween to resiliently mount the window within the frame. A weather strip 46 secured to door frame 28 and door 24 in a suitable manner extends around the upper, forward, and lower edges of the forward portion of window opening 30 to seal the respective edges of the ventilation window in the closed position thereof. A weather strip 50 secured to guide channel 32 seals the rear edge of the ventilation window in the closed position thereof.

A stud 52 is welded or otherwise secured to the upper leg of frame 40 and extends through the weather strip 46 into the upper door frame 28. The upper end of the stud terminates in a ball 54 which is rotatably received within a socket 56 secured in a suitable manner to the upper door frame 28. A similar stud 60 is secured to the lower leg of frame 40 and extends through the weatherstrip 46 into door 24 where it is rotatably supported in a suitable manner. As shown schematically in Figure 1, stud 60 may terminate in a pinion 62 which is driven by a pinion 64 through a manually operated handle 66 in order to move the ventilation window between a closed position, as shown in Figures 1 through 3, and an open position, as shown in Figure 4, with this movement of the ventilation window being about a substantially vertical axis defined by studs 52 and 60.

When the ventilation window 38 is in open position, as shown in Figure 4, the window is located transversely of the window opening 30, with the forward portion of the window being located inwardly of the body and the rearward portion being located outwardly of the body. The oncoming air stream will ordinarily strike the outer surface 68 of the ventilation window so as to be deflected forwardly and inwardly of the body while the air stream will also exhaust air from within the body from between the inner surface 70 of the ventilation window and the guide channel 32. Since the ventilation window is reduced in size due to the wrap-around windshield, only a very small portion of the window projects into the oncoming air stream. As shown in Figure 4, the outer surface of door frame 28 lies in a generally vertical plane substantially parallel to the window opening 30 and located approximately along a line indicated at 72. Thus, only a relatively small portion of the ventilation window projects outwardly of the plane of door frame 28 into the oncoming air stream. Due to the reduction in size of the ventilation window and the relatively small portion of the window projecting into the oncoming air stream, the ventilation window is less effective in deflecting the oncoming air inwardly of the body and of also exhausting the air from within the body. This creates a problem, particularly due to the widespread public acceptance of the "no-draft" ventilation system. This problem is solved by this invention by providing a second window 76 which is fixedly supported by the ventilation window in substantially parallel spaced relationship thereto and outwardly of the body.

Upper and lower channel members 78 and 80, respectively, of like construction are provided to fixedly receive respective edge portions of the second window 76. Each channel member includes a laterally extending flange portion 82 terminating in a laterally extending flange 84 which is received between frame 40 and the window glass and secured to the frame in a suitable manner in order to mount the channel members on the ventilation window frame.

As can be seen in Figures 3 and 4, the second window is larger in size and extends some distance beyond the rear edge portion of the ventilation window in all positions thereof. In the closed position of the ventilation window, as shown in Figures 1 and 3, the second window 76 is located outwardly of the ventilation window and extends over a portion of the vertically movable window 36. However, since the second window is transparent, no obstruction to vision occurs and the vertically movable door window 36 may be moved to either position thereof without any interference therebetween. It will also be noted that when the vertically movable door window 36 is in open position, the extension of the second window over the forward portion of the door window opening provides for deflection of the oncoming air rearwardly and away from the driver or other seat passenger so as to increase the comfort of the occupants of the vehicle. Thus, the second window 76 adds to the function of the window arrangement of the body when the ventilation window 38 is in closed position and the door window 36 is in open position.

When the ventilation window is in open position, as shown particularly in Figure 4, the second window 76 extends outwardly of the rear edge portion of the ventilation window to present an increased window area to the oncoming air stream so as to deflect this air stream inwardly of the body. In addition, the air stream will also be more effective in exhausting air from within the body along the rear inner surface of the ventilation window and the inner surface of that portion of the second window which extends outwardly beyond the ventilation window. It will also be noted that the forward edge portion of the second window does not extend inwardly of the body beyond the forward edge portion of the ventilation window since the edges are co-extensive although spaced. Thus, the second window does not create any hindrance for the driver.

Referring now particularly to Figures 5 through 10 of the drawings, another embodiment of a ventilation window arrangement according to this invention will be described. The body and the mounting of the ventilation window on the body are the same as those previously described in conjunction with Figures 1 through 4 and, therefore, the same numerals have been used. As shown particularly in Figure 8, upper and lower guide channels 90 and 92, respectively, slidably receive the respective edge portions of the second window 94. Each of the guide channels includes a generally angular flange 96 extending from the base thereof and fitting over the base and inner leg of frame 40 and a generally L-shaped flange 98 extending inwardly from the inner leg of the flange and fitting between the outer leg of frame 40 and the ventilation window 38. Flanges 96 and 98 in turn are secured to frame 40 in a suitable manner in order to fixedly secure the guide channels 90 and 92 to the frame. As shown particularly in Figure 7, each of the flanges 96 is cut away at 100 in order to provide clearance for the studs 52 and 60 which swingably mount the ventilation window on the body as previously described.

Referring now particularly to Figures 6 and 7, it will be noted that the upper edge of the second window 94 is partially cut away so as to provide an outwardly and rearwardly opening groove 102. An opening 104 is cut in the base of the guide channel 90 and a spring clip 106 has one end thereof fitted around the outer terminal web 107 of the opening to mount the clip on the guide channel. The clip further includes a generally U-shaped portion 108 which bears against the base of groove 102 and terminates in a laterally extending flange 110 spaced above the base of the guide channel 90. A limit stop 114 which is of the same construction as the guide channels but of smaller size is secured to the forward leg of frame 40 in order to limit the forward or inward sliding movement of the second window 94 relative to the ventilation window 38 and position the second window in its inner limit position. Additionally, a finger grip 116 is provided in window 94 adjacent the rear edge portion thereof by forming a groove in the window.

The second window 94 may be moved outwardly and rearwardly of the ventilation window in either position thereof by manually grasping the finger grip 116 and pulling the window outwardly of the guide channels 90 and 92. When the window 94 has been moved to its outer limit position, the shoulder 118 of groove 102 will engage the forward leg 120 of the U-shaped portion 108 of clip 106 in order to prevent the second window from being pulled completely out of the guide channels. Similarly, the second window 94 may be moved inwardly of the guide channels 92 until the forward edge of the window engages stop 114 so as to position the second window 94 in its inner limit position.

Figure 10:
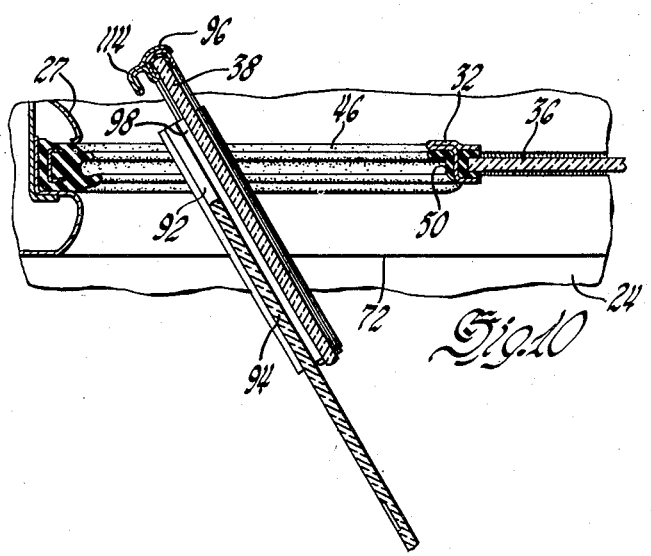
Figure 10 is a view similar to Figure 9 and showing the ventilation window arrangement in open position.

When the ventilation window 38 is in open position and the second window 94 is in its outer limit position, as shown in Figure 10, the second window functions in the same manner as does the fixed second window 76 of the first embodiment of this invention. However, it will be noted that the second window 94 is substantially smaller than the second window 76 so that the second window 94 must be moved to its full outer limit position in the open position of the ventilation window in order that the second window will project outwardly of the ventilation window the same distance as does the second window 76. When the ventilation window is in closed positon and the second window 94 is in its inner limit position, the second window projects only slightly beyond the guide channel 32 so as to cover only a relatively small portion of the door window opening. However, the second window 94 may be easily moved outwardly and rearwardly of the guide channels when the ventilation window is in closed position so as to cover substantially the same portion of the door window opening as does the second window 76 so as to deflect the oncoming air rearwardly and inwardly of the body when the door window is in open position to add to the comfort of the driver and to the seat passengers.

The second window 94 of this embodiment of the invention offers certain advantages over the second window 76 of the first embodiment of the invention, particularly since the second window 94 can be removed as will be described in order to clean both the second window and the ventilation window. When the ventilation window is in a partially open position, the second window 94 may be moved rearwardly and outwardly of guide channels 90 and 92 until the shoulder 118 engages the leg 120 as previously described. Thereafter, the flange 110 of the spring clip may be grasped and the spring clip moved upwardly until the U-shaped portion 108 is located above opening 104 so that the second window 94 may be removed. The spring clip can then be released. When it is desired to replace the second window 94, the window is fitted into the guide channels 90 and 92 and thereafter pushed inwardly, with the forward portion of the upper edge of the window acting to cam the U-shaped portion 108 of the spring clip upwardly within opening 104 until shoulder 118 has cleared the clip whereby the clip will return to its normal position as shown in Figure 6. This feature of the invention is a distinct advantage since dust and dirt are apt to collect on the outer surface of the ventilation window and the inner surface of the second window during operation of the vehicle to present a safety hazard in that the vision of the driver may be obscured.

Referring now particularly to Figures 11 through 15 of the drawings, another embodiment of the invention will be described. The body and the mounting of the ventilation window on the body are the same as that previously described in conjunction with the first embodiment of this invention and, therefore, the same numerals have been used and no further description is believed necessary. Similarly, the mounting of the second window 130 on the ventilation window is the same as that described in conjunction with the second embodiment of the invention and, therefore, the same numerals have been used and no further description is believed necessary.

This embodiment of the invention differs from that previously shown and described in conjunction with the second embodiment in that means are provided for automatically moving the second window 130 to a position outwardly beyond the ventilation window as the ventilation window is moved from a closed to an open position and for returning the second window to its normal position when the ventilation window is moved from an open to a closed position. This means generally comprises swingable links interconnecting the door frame 28 and the window and will now be described with particular reference to Figures 11 and 12. Upper and lower generally L-shaped brackets 132 and 134, respectively, of like construction are secured in spaced relationship to the forward frame member 27 of the upper door frame 28 by screws 137. Upper and lower channels 136 and 138, respectively, are secured in a suitable manner to respective edge portions of the second window 130 and are slidably received in guide channels 90 and 92. Upper and lower links 140 and 142, respectively, are pivotally secured at 144 at one end thereof to brackets 132 and 134 and are pivotally secured at 146 at the other end thereof to laterally extending flanges 148 of channels 136 and 138.

When the ventilation window is in closed position, as shown in Figures 11 through 13, the second window 130 is located in substantially parallel spaced relationship to the ventilation window 38 and only projects slightly beyond the rearward edge of the ventilation window. The links are disposed substantially parallel to the second window and are located inwardly of the outer plane 72 of the upper door frame 40 so that no portion of the mechanism projects outwardly of the body to present a safety hazard. When the ventilation window is moved to an open position, as shown in Figure 14, the movement of the ventilation window will cause the links to move the second window 130 outwardly of channels 90 and 92 to its outer limit position so that the second window will project outwardly beyond the ventilation window to provide the increased effective window area. This window area is provided by both the ventilation window 38 and the second window 130 as in the second embodiment of the invention to deflect air inwardly of the body and to exhaust air from within the body. Similarly, movement of the ventilation window to closed position will move the second window inwardly within the guide channels 90 and 92 to its inner limit position, as shown in Figures 11 through 13.

Thus, this invention provides an improved ventilation window arrangement for vehicle bodies wherein a second window supported by the ventilation window for movement therewith is projected outwardly of the ventilation window in the open position thereof so as to provide an increased effective window area projecting outwardly of the body. This increased effective window area adequately deflects the oncoming air inwardly of the body and also adequately exhausts the air from within the body so as to retain all of the advantages of the "no-draft" ventilation system even though the ventilation window has been reduced in size due to body styling.

I claim:

1. A window arrangement for a vehicle body having a window opening therein comprising, a first window supported on said body for movement between a closed position wherein said window closes one portion of said opening and an open position within said body, a second window supported on said body for movement between a closed position wherein said window closes the other portion of said opening and an open position transversely of said opening, and a third window supported on said body for movement with said second window between said open and closed positions thereof and projecting outwardly of said second window in the open position thereof to increase the effective window area located transversely of the plane of said opening in the open position of said second window.

2. A window arrangement for a vehicle body having a window opening therein comprising, a first window supported on said body for movement between a closed position wherein said window closes one portion of said opening and an open position within said body, a second window supported on said body for movement between a closed position wherein said window closes the other portion of said opening and an open position transversely of the plane of said opening, and a third window supported on said body for movement with said second window between a first position located in spaced relationship with the plane of said opening and a second position located transversely of the plane of said opening and projecting outwardly of said second window in the open position thereof to increase the effective window area located transversely of the plane of said opening in the open position of said second window.

3. A window arrangement for a vehicle body having a window opening therein comprising, a first window supported on said body for movement between a closed position wherein said window closes one portion of said opening and an open position within said body, a second window supported on said body for movement between a closed position wherein said window closes the other portion of said opening and an open position located transversely of the plane of said opening wherein one portion of said second window projects outwardly of said body to deflect air, and a third window supported on said body for movement with said second window between a first position located in spaced relationship with said second window and the plane of said opening and a second position located in spaced relationship with said second window and transversely of the plane of said opening, said third window projecting outwardly of said one portion of said second window in the open position thereof to increase the effective air deflection area located transversely of the plane of said opening in the position of said second window.

4. A window arrangement for a vehicle body having a window opening therein comprising, a first window supported on said body for movement between a closed position wherein said window closes one portion of said opening and an open position within said body, a second window supported on said body for movement between a closed position wherein said window closes the other portion of said opening and an open position transversely of the plane of said opening wherein one portion of said window projects inwardly within said body and the other portion of said window projects outwardly of said body to deflect air inwardly of the body, and a third window supported by said second window in substantially parallel spaced relationship thereto and outwardly of said body for movement therewith between said open and closed positions, said third window projecting outwardly of said other portion of said second window in the open position thereof to increase the effective air deflection area located transversely of the plane of said opening and outwardly of said body.

5. A window arrangement for a vehicle body having a window opening therein comprising, a first window supported on said body for movement between a closed position wherein said window closes one portion of said opening and an open position within said body, a second window supported on said body for movement between a closed position wherein said window closes the other portion of said opening and an open position transversely of the plane of said opening wherein one portion of said window projects outwardly of said body to deflect air, and a third window slidably supported by said second window in spaced relationship thereto for movement therewith between said open and closed positions, said third window being slidable relative to said second window in the open position thereof to a position projecting outwardly of said one portion of said second window to increase the effective air deflection area projecting outwardly of said body and transversely of the plane of said opening.

6. A window arrangement for a vehicle body having a window opening therein comprising, a first window supported on said body for movement between a closed position wherein said window closes one portion of said opening and an open position within said body, a second window supported on said body for movement between a closed position wherein said window closes the other portion of said opening and an open position transversely of the plane of said opening wherein one portion of said window projects outwardly of said body to deflect air, a pair of spaced opposed channels supported on said second window for movement therewith and located outwardly of said second window, and a third window slidably supported in said channels for movement with said second window between said open and closed positions thereof, said third window being slidable within said channels to a position projecting outwardly of said one portion of said second window in the open position thereof to increase the effective air deflection area located transversely of the plane of said opening in the open position of said second window.

7. A window arrangement for a vehicle body having a window opening therein comprising, a first window supported on said body for movement between a closed position within the plane of said opening and an open position transversely of the plane of said opening, a second window slidably supported on said first window in spaced relationship thereto for movement therewith between said first and second positions, and means operatively interconnecting said second window and said body whereby said second window is moved relative to said first window as said first window moves to open position to project said second window outwardly of said one portion of said first window and increase the effective air deflection area located transversely of the plane of said opening in the open position of said first window.

8. A window arrangement for a vehicle body having a window opening therein comprising, a first window supported on said body for movement between a closed position within the plane of said opening and an open position transversely of the plane of said opening wherein one portion of said window projects outwardly of said body to deflect air, a second window fixedly supported on said first window in substantially parallel spaced relationship thereto and outwardly thereof for movement therewith between said first and second positions, said second window projecting beyond said one portion of said first window whereby said second window will increase the effective air deflection area located transversely of the plane of said opening in the open position of said first window.

9. A window arrangement for a vehicle body having a window opening therein comprising, a first window supported on said body for movement between a closed position wherein said window closes one portion of said opening and an open position within said body, a second window supported on said body for movement between a closed position wherein said window closes the other portion of said opening and an open position transversely of the plane of said opening wherein one portion of said window projects outwardly of said body to deflect air, a third window slidably supported on said second window and outwardly thereof for movement relative thereto in either the closed or open positions thereof, said third window being slidable outwardly of said one portion of said second window when said second window is in said open position thereof to increase the effective air deflection area located transversely of the plane of said opening.

10. A window arrangement for a vehicle body having a window opening therein comprising, a first window swingably supported on said body for movement between closed position within the plane of said opening and an open position transversely of the plane of said opening wherein one portion of said window projects outwardly of said body to deflect air, a second window slidably supported on said first window for movement in substantially parallel spaced relationship thereto and outwardly thereof between an inner limit position wherein said second window is substantially coextensive with said first window and an outer limit position wherein said second window projects outwardly beyond said one portion of said first window to increase the effective air deflection area, and means operably interconnecting said second window and said body for automatically moving said second window to said outer limit position thereof when said first window is moved from said closed to said open position and for moving said second window to said inner limit position thereof when said first window is moved from said open to said closed position.

References Cited in the file of this patent

UNITED STATES PATENTS 2,513,744   Rawson _____ July 4, 1950

FOREIGN PATENTS 1,008,148   France _____ Feb. 13, 1952